Figure 1:
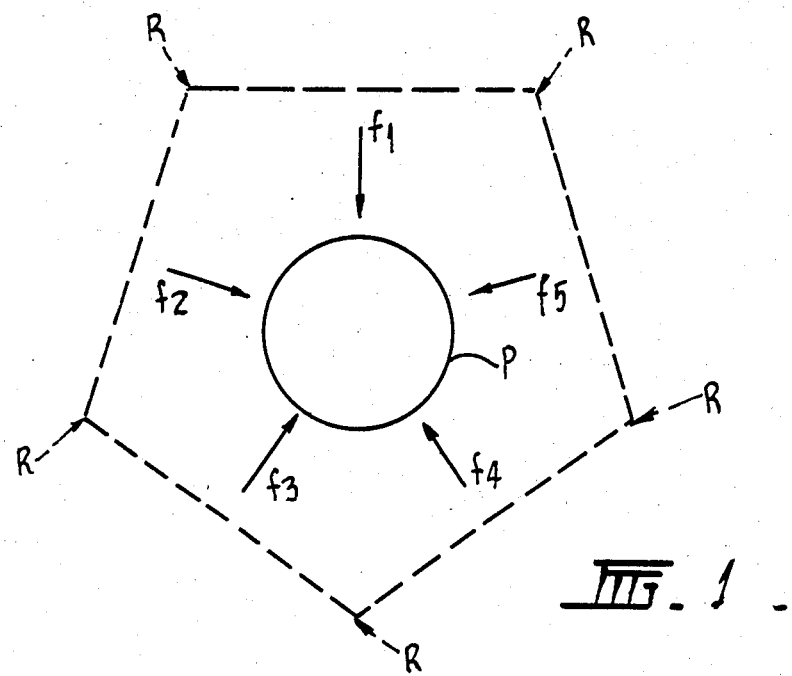

United States Patent [19]

Tran

[11] Patent Number: 4,631,380
[45] Date of Patent: Dec. 23, 1986

[54] SYSTEM FOR THE MICROWAVE TREATMENT OF MATERIALS

[75] Inventor: Van N. Tran, Marshall, Australia
[73] Assignee: Durac Limited, Australia
[21] Appl. No.: 643,810
[22] Filed: Aug. 23, 1984
[30] Foreign Application Priority Data
Aug. 23, 1983 [AU] Australia .............................. PG 0992
[51] Int. Cl.⁴ ............................................... H05B 6/72
[52] U.S. Cl. ........................ 219/10.55 A; 219/10.55 F; 219/10.55 M
[58] Field of Search ................. 219/10.55 R, 10.55 A, 219/10.55 F, 10.55 B, 10.55 E, 10.55 M; 34/1

[56] References Cited

U.S. PATENT DOCUMENTS

| | | | |
|---|---|---|---|
| 2,463,569 | 3/1949 | Smith | 219/10.55 R |
| 2,943,174 | 6/1960 | Parker | 219/10.55 R X |
| 3,691,338 | 9/1972 | Chang | 219/10.55 R |
| 4,004,122 | 1/1977 | Hallier | 219/10.55 A |
| 4,093,840 | 6/1978 | Jean et al. | 219/10.55 M X |
| 4,129,768 | 12/1978 | Anderson | 219/10.55 A |
| 4,323,745 | 4/1982 | Berggren | 219/10.55 F X |
| 4,339,648 | 7/1982 | Jean | 219/10.55 M |
| 4,441,003 | 4/1984 | Eves, II et al. | 219/10.55 A |

Primary Examiner—Philip H. Leung
Attorney, Agent, or Firm—Scully, Scott, Murphy & Presser

[57] ABSTRACT

A system for treating materials using microwave radiation comprising a generally pentagonal casing supporting at least one microwave source centrally of each side of the casing, a central cylindrical passageway for conveying the material to be treated and towards which the microwave sources are directed, the corners of the pentagonal casing acting as reflectors which reflect any microwave radiation passing through the material being treated back towards the material. Means may be provided for preheating material to be treated using heat collected from the treated material and from each of the microwave sources. The material to be treated may be fed by gravity through the central passageway or the passageway may be disposed horizontally and the material fed through the passageway using an auger or a conveyor belt. The conveyor belt is most conveniently supported by inclined rollers so that the material being conveyed adopts a profile which is at least partially cylindrical in shape.

17 Claims, 6 Drawing Figures

SYSTEM FOR THE MICROWAVE TREATMENT OF MATERIALS

This invention relates to a system and method of treating materials such as grains, soils, wool, cotton, resins (accelerated curing), foodstuffs, such as caramel, liquids, such as sewage, and other materials by means of microwave energy.

The use of microwave energy for cooking, sterilizing and freeze drying has been well known for many years. It is for example known to sterilize soil by means of microwave energy but all soil sterilizing systems so far proposed operate on a batch-wise basis with consequential problems associated with uneven penetration of the microwave energy and the loading and unloading of each batch.

Microwave energy has also been used to advantage in drying grains, destroying insects and deactivating enzymes in and killing fungus on seeds. However, the use of microwave energy in the treatment of grains in a continuous flow process is a recent innovation and the systems so far proposed require complex mechanisms for stirring the grain to ensure even penetration of the microwave energy. One such system is described in greater detail in the Aug. 1982 edition of "Successful Farming" in an article entitled "Microwave Grain Drying". The complexity of the mechanical transporting system is self-evident and notwithstanding the grain stirring mechanism shown, uniform treatment of the grain is still not fully achieved.

It is the object of the present invention to provide a simple and effective system and method for treating materials using microwave energy. A preferred objective is to provide a system and method for treating moving materials although the invention is not restricted thereto since it does serve to improve the treatment of materials even on a batchwise basis.

The invention accordingly provides a system for the microwave treatment of materials comprising a treatment zone, means for directing microwave radiation into said zone along at least three different axes arranged in spaced relation around said zone, said axes being offset in relation to each other, means for reflecting the microwave radiation directed along each axis back into said treatment zone after it passes through said zone, said microwave radiation being non-coherent.

It will be appreciated that the radiation axes are offset to reduce mutual coupling and to assure maximum effectiveness of each source. The arrangement of the microwave radiation axes in opposed relationship to each other would cause at least partial coupling and thus cancelling of each source by the other.

In a preferred embodiment, a separate microwave generating means is arranged to direct microwave energy along each axis. However, it should be appreciated that one source may be used to supply the several radiation introduction axes by the use of suitable cables or waveguides(s).

Each source of microwave energy is not only non-coherent but is also of different phase to the other sources. Where one source supplies several introduction axes, the phase changes necessary are introduced by the cables or waveguide(s). Experiments leading to the present invention have lead to the conclusion that the use of random phases improves the uniform heating of the material.

The radiation directed along each axis is preferably concentrated on the treatment zone by a suitably shaped radiator or applicator such as a horn.

The material to be treated is preferably transported through the treatment zone by a suitable transporting means.

The transporting means preferably operates to transport the material in at least a partially cylindrical form. The transportation of the material in a partially cylindrical form causes a degree of focusing of each microwave source on the material to be treated to thereby ensure a more efficient penetration of the material by the microwave radiation.

In a particularly preferred form of the invention, the material is conveyed through a tubular passage defining the treatment zone whereby the material assumes a substantially cylindrical form which causes maximum focusing of each microwave source on the material to be treated.

The several microwave sources may be operated at different frequencies and are of different phase, each frequency being selected according to its desired effect on the material(s) being treated. In this regard, it will be appreciated that different materials have different dielectric loss factors and are therefore heated more or less effectively according to the frequency of the selected radiation. For example, wheat and rice grains are most effectively heated by radiation having a frequency of the order of 2450 MHz whereas weevils are most efficiently heated by radiation at a frequency of the order of 40 MHz.

In a particularly preferred form of the invention, the frequencies at which at least two of the microwave sources operate are such as to produce a difference frequency of the required magnitude in a treatment region. For example, in the treatment of grain containing weevils, one source may be operated at about 2450 MHz while another source may be operated at 2410 MHz so as to produce a difference frequency of 40 MHz which is more effective against weevils. Of course other frequency combinations may be used to attain other desired results.

In a system embodying a preferred form of the present invention, five microwave sources are arranged in a generally pentagonal casing surrounding a central cylindrical passage through which the material to be treated is passed. The passage may be defined by a tube of plastics, ceramic, glass or other material which may be penetrated by the microwave radiation. The microwave sources are preferably located centrally of each side of the pentagonal casing so that each source is arranged opposite a corner of the casing which acts as an integral reflector for the radiation to return the radiation passing through the treatment zone to the treatment zone.

It will be appreciated from the above that the invention may comprise the use of any odd number of microwave sources arranged such that the direction of radiation does not intersect the direction of radiation of any other source. The maximum number of microwave sources will of course be dictated by physical limitations.

The invention also provides a method of treating materials using microwave radiation comprising the steps of directing non-coherent microwave radiation from at least three different directions into a treatment zone containing material to be treated along axes which are offset in relation to each other, and reflecting any microwave radiation which passes through said treatment zone back into said treatment zone.

In a preferred form of the method, the material to be treated is transported through said treatment zone, preferably so that the material is in at least a partly cylindrical form as it passes through said treatment zone.

The microwave radiation directed into said zone is preferably operated at at least two different frequencies and more preferably at frequencies which produce a desired difference frequency. Other preferred features of the method will be understood by consideration of the preferred aspects of the system defined in greater detail above.

One preferred embodiment of the invention will now be described in greater detail with reference to microwave grain insect disinfestation. However, it will be appreciated that the invention is equally applicable to the treatment of other materials, including the curing of resins and of fibreglass including liquids such as foodstuffs and even sewage and to the operation of one or more of the microwave sources at different operating frequencies.

Figure 2:
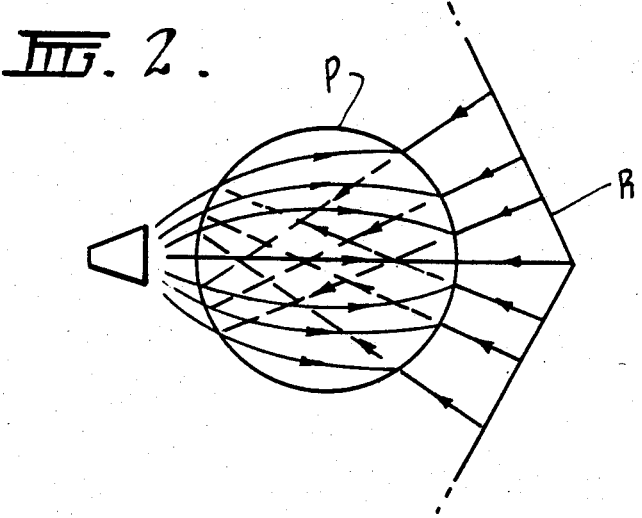
Figure 3:
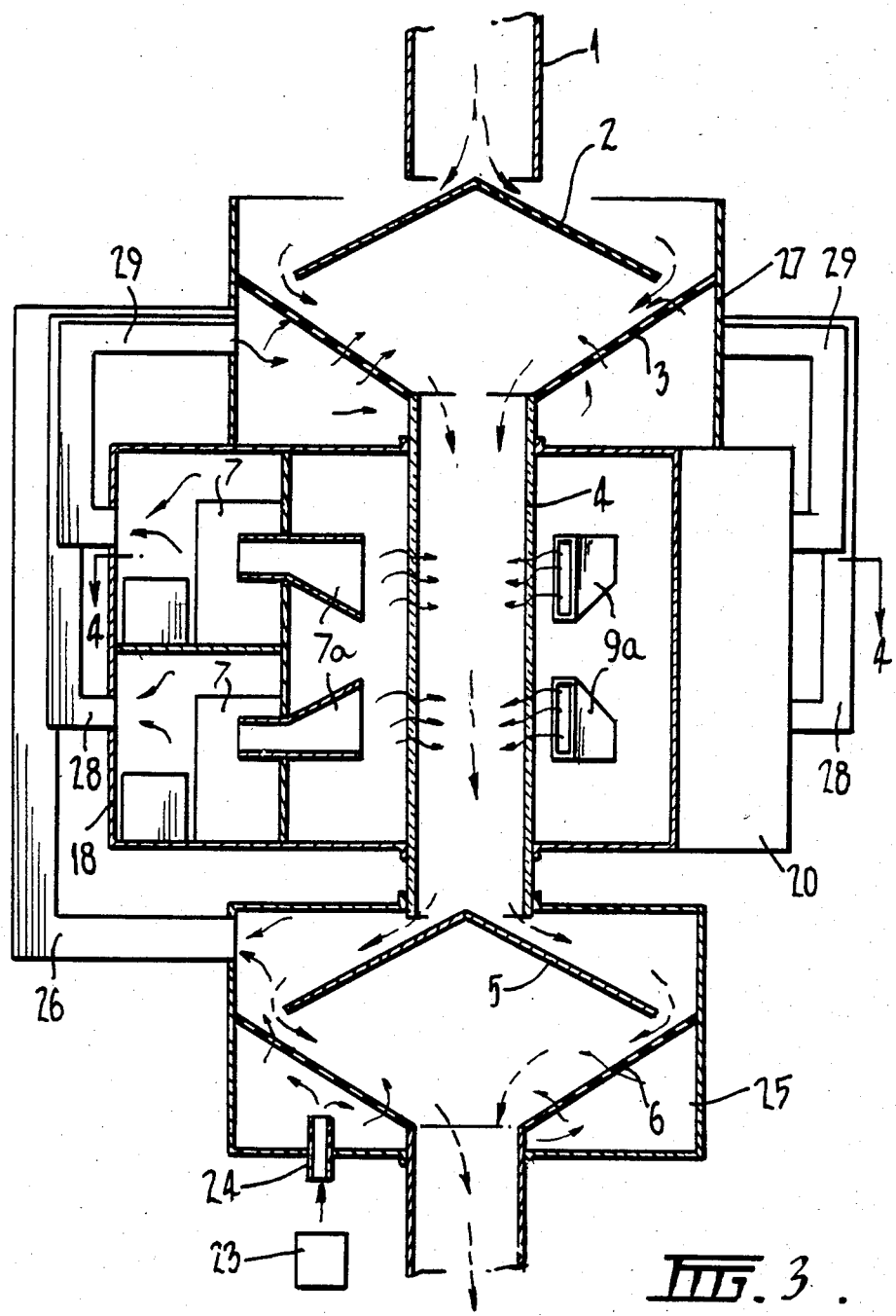
Figure 4:
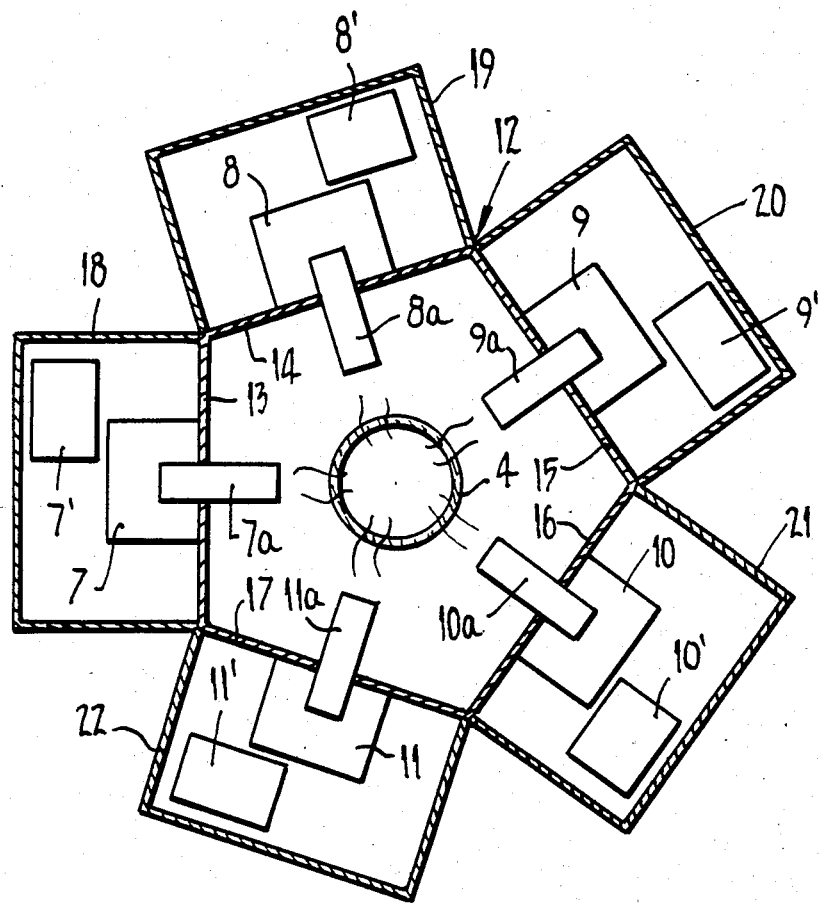
Figure 5:
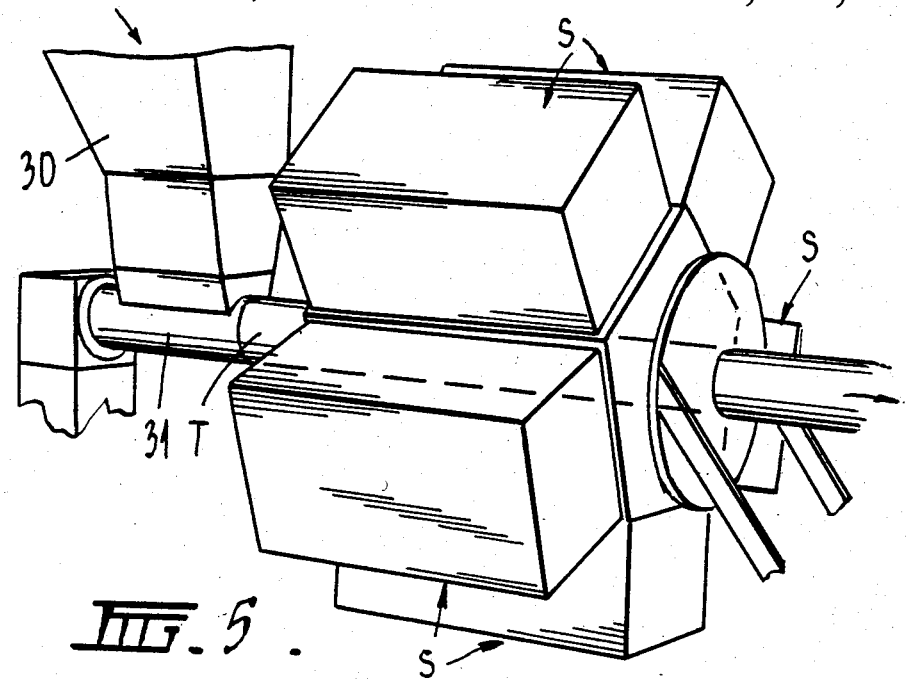
Figure 6:
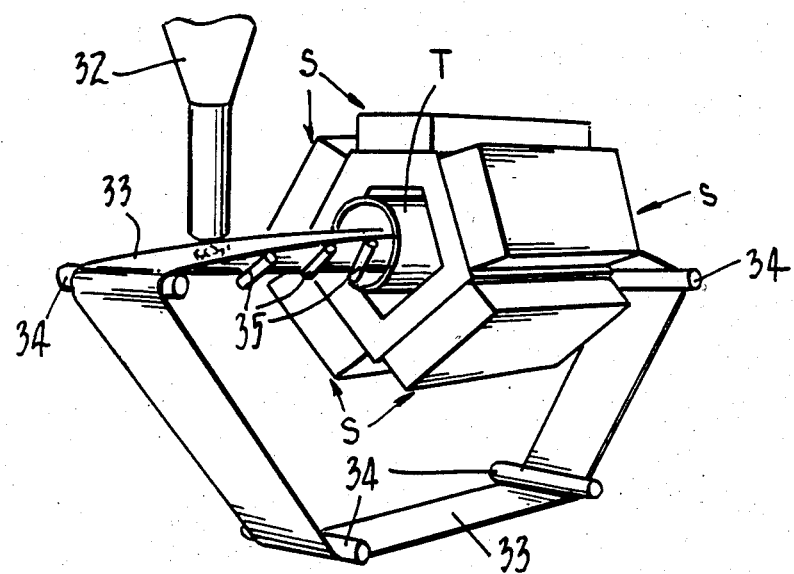

In the accompanying drawings:

FIG. 1 is a schematic diagram showing the several principles of the present invention;

FIG. 2 is a schematic diagram showing the manner in which the microwave radiation source is focused, FIG. 3 is a somewhat schematic sectional elevation showing one embodiment of a microwave disinfestation unit, FIG. 4 is a sectional plan view of the unit of FIG. 3, FIG. 5 is a perspective view of a disinfestation unit embodying the invention, and FIG. 6 is a perspective view of a further modified unit embodying the invention.

Referring firstly to FIGS. 1 and 2 of the drawings, it will be noted that five microwave radiation sources operating at five different frequencies f1 to f5 are arranged in spaced relation around a generally circular passageway P through which a material to be treated is adapted to flow, either vertically or horizontally. The microwave sources are non-coherent and of different phase, and the frequencies may be selected so as to produce minimum mutual coupling as well as desired difference frequencies, which in the present embodiment are preferably known radio frequencies which are most effective against insects. Experimental results show that microwave treatments resulting in surface temperature of 63° C. was sufficient to kill all stages of *Sitophilus Oryzae* (L.), *S. granarius*, *Rhyzo Pertha dominica* (F.), *Triobolium crastarium* and *oryzaephilus surina nemsis*.

The axis of radiation of each source is offset in relation to the other sources so that any cancellation effect between sources is reduced to a minimum. The transporting of the material to be treated through a generally circular passageway P causes each microwave source to focus on the material in the passageway in the manner shown schematically in FIG. 2 of the drawings. To improve focusing, a reflector R is located directly opposite each microwave source and in the present embodiment this is conveniently achieved by arranging the microwave sources in a reflective housing having corner reflectors opposite each side supporting a microwave source, as shown in greater detail in FIG. 4 of the drawings.

The material to be treated by the microwave radiation is preferably preheated before entering the treatment zone and this is most conveniently achieved by utilizing the heat generated by the microwave sources and the heated material. Such an arrangement is shown in FIG. 3 of the drawings and is described in further detail below.

Referring now to FIGS. 3 and 4 of the drawings, the material to be treated is discharged from an outlet pipe 1 from a hopper or the like (not shown) onto a conical spreader plate 2 from which it flows over a frusto-conical open mesh heating surface 3 into a tubular passageway 4, from which the heated material flows over a further conical spreader plate 5 and is discharged through a funnel arrangement including a further open-mesh surface 6. The tubular passageway 4 is formed from the pvc, Pyrex, glass, fibreglass or some other non-metallic material which is transparent to microwave radiation. The passageway 4 is surrounded by five vertically spaced pairs of microwave generators 7, 8, 9, 10 and 11, to which directing horns 7a, 8a, 9a, 10a and 11a of standard construction are attached so as to concentrate the microwave energy on the material passing through the passageway 4. In the present embodiment, the microwave sources 7 to 11 consist of microwave generators from commercially available microwave ovens having their operating frequencies suitably adjusted. The microwave sources 7 to 11 are supported on a generally pentagonal housing 12 so that the horns 7a to 11a project centrally from the sides 13, 14, 15, 16 and 17 respectively of the housing 12. In this arrangement, the microwave sources 7 to 11 are directed at the intersections between the opposite sides of the housing 12 which thus act as reflectors to direct the microwave radiation from each source which passes through the passageway 4 and the material contained therein back towards the passageway 4 in the manner shown in FIGS. 1 and 2 of the drawings.

The pairs of microwave sources 7 to 11 are contained in housings 18, 19, 20, 21 and 22 attached to the sides 13, 14, 15, 16 and 17 respectively and the housings 18 to 22 not only contain the microwave sources 7 to 11 and their associated electrical systems 7' to 11' but also act as a means for collecting the heat generated by the microwave sources 7 to 11 which is used to heat the material flowing over the surface 3 as described further below.

As is shown in FIG. 3 of the drawings, a blower 23 is connected to an inlet 24 to a chamber 25 surrounding the open mesh surface 6 to force air through the open mesh and the material flowing thereover whereby the air collects heat from the material. The heated air passes out of the chamber through a duct 26 which conveys the heated air to a chamber 27 surrounding the open mesh heating surface 3 to preheat the material flowing over the surface 3 prior to its entry into the tubular passageway 4. Similarly, each microwave source has a cooling fan (not shown) associated therewith and the heated air from these sources is conveyed via ducts 28 and 29 passing through the wall of each housing 18 to 22 and open into the chamber 27 to additionally heat the material flowing over the open mesh surface 3.

Referring now to FIGS. 5 and 6 of the drawings, two alternative microwave treatment systems are shown somewhat schematically. In each case, the material to be treated by the microwave sources is transported generally horizontally through a central tube T of the type described above. In each case, microwave sources S are supported by a pentagonal housing surrounding the central passageway in an arrangement similar to that shown in FIGS. 3 and 4 of the drawings. In each of the embodiments of FIGS. 5 and 6, the heating requirements dictate that five sets of three longitudinally spaced microwave sources are used although it will be appreciated that, depending on the material to be treated, a smaller or greater number of microwave units may be used.

In the case of the embodiment of FIG. 5, the material to be treated, which may be grain or soil, is delivered to a hopper 30 and is conveyed along the central passageway by means of an auger 31. In the case of the embodiment of FIG. 6 of the drawings, the material to be treated is delivered from a hopper 32 onto a continuous belt 33 which supported by rollers 34 and is formed by two sets of inclined rollers 35 (the rear set is obscured by the apparatus) into a generally U-shaped supporting structure for the material in which configuration the material is conveyed through the central passageway for treatment by the microwave units. By supporting the material in this manner, it assumes a generally cylindrical form which assists in focusing as described above.

As has been mentioned above, the operating frequencies of the microwave units are suitably adjusted depending on the material to be treated so that the maximum heating effect of the material is achieved. In the case of the embodiment of FIGS. 3 and 4 of the drawings, where the material to be treated is rice or wheat grain containing weevils, each of the microwave sources 7 to 11 is adjusted to approximately the same frequency of 2450 MHz±20 MHz. In experimental use, such an arrangement has been found to successfully treat approximately 1 tonne of cereal per hour on a continuous basis.

The microwave sources may alternatively operate at a range of frequencies with at least two of the sources in the same horizontal plane operating at frequencies which will produce a desired difference frequency effective against a particular insect. In the case of weevils, it is known that they are most effectively treated by means of a frequency of the order of 40 MHz so that if two of the sources are operated at frequencies 2410 MHz and 2450 MHz the desired difference frequency will be produced. In such an arrangement, it is preferred that each pair of microwave sources should be operated at the same frequency although this is not critical.

In the case of the embodiments of FIGS. 5 and 6 of the drawings, the operating frequencies of each set of three spaced microwave sources may be the same or may be different. For example, acceptable results have been obtained treating infested wheat by adjusting the frequencies of the five sets of three microwave sources to 2410 MHz, 2420 MHz, 2430 MHz, 2440 MHz and 2450 MHz.

Improved results may also be obtained by subjecting the material to be treated by the microwave radiation in the presence of an inert gas. Thus, for example, the central passageway in each case may be filed with nitrogen, carbon dioxide, helium or some other inert gas instead of air.

It should be noted that the embodiments of FIGS. 5 and 6 of the drawings may be modified by the incorporation of a preheating arrangement operating on the same principle as the preheating arrangement of FIGS. 3 and 4 of the drawings in which hot air is collected from a discharge chamber similar to the discharge chamber shown in FIG. 3 of the drawings and collected from the various microwave generators and supplied to a preheating unit, forming part of the grain delivery system of the unit, similar to the preheating unit shown in FIG. 3 of the drawings.

It will also be appreciated from the above description that the user of the various embodiments of the present invention are many and varied. Although the embodiments have been described in relation to the treatment of wheat, rice and other grains, the invention is equally applicable to the treatment of foodstuffs, such as heating water, sugar and milk to form caramel on a continuous basis, the sterilization of liquids such as coconut milk or the heating of other liquids such as sewage. Furthermore, the invention may be used in curing fibreglass and other resins. In fact, the embodiments of FIG. 6 of the drawings has been used to cure a fibreglass yacht mast. Other uses include the recycling of nylon and other plastics wastes.

What we claim is:

1. A system for the microwave treatment of materials, comprising a treatment zone including means to confine the material to be treated in at least a partly cylindrical form, radiation means spaced from and outside said treatment zone for directing microwave radiation into said zone along at least three different axes of radiation, said radiation means being arranged in spaced relation around said zone, said axes of radiation being in spaced relation to each other at the radiation means, means for reflecting the microwave radiation directed along each axis back into said treatment zone after it passes through said zone, said microwave radiation being non-coherent, said at least partly cylindrical confinement of said material to be treated serving to focus said microwave radiation on the material contained in said treatment zone.

2. The system of claim 1, wherein each microwave radiation directing means is of different phase to each one of the other sources.

3. The system of claim 2 wherein the radiation directed along each axis is concentrated on the treatment zone by means of an applicator or radiator, such as a horn.

4. The system of claim 1 or 3, wherein the material to be treated is transported through said treatment zone by transporting means which operates to transport the material in at least a partially cylindrical form.

5. The system of claim 4, wherein the said material is conveyed through a tubular passage defining said treatment zone whereby the material to be treated assumes a substantially cylindrical form which causes maximum focusing of each source of microwave radiation on the material to be treated.

6. The system of claim 4, wherein the material to be treated is conveyed through said treatment zone by means of a flexible conveyor belt which assumes a generally u-shaped profile which in turn confines the material in said treatment zone in a substantially cylindrical form.

7. The system of claim 2, wherein there are at least three separate microwave radiation sources each of which is operated at a different frequency.

8. The system of claim 7, wherein said different frequencies are selected to produce desired difference frequencies which are effective against insects or organisms within the material to be treated.

9. A system for the microwave treatment of materials, comprising a treatment zone including means to confine the material to be treated in at least a partly cylindrical form, said treatment zone being surrounded by a generally pentagonal casing, said casing being formed from microwave radiation reflective material whereby the corner regions of said pentagonal casing define reflectors which reflect microwave radiation passing from each source and through said treatment zone back towards said treatment zone, said microwave radiation sources being non-coherent and of different phase, said at least partly cylindrical confinement of said material to be treated serving to focus said microwave radiation on the material contained in said treatment zone.

10. The system of claim 9, wherein a plurality of microwave radiation sources are arranged in spaced relation along each side of said casing.

11. The system of claim 10, wherein each of said plurality of microwave radiation sources operates at approximately the same frequency.

12. The system of claim 10, wherein each of said plurality of microwave radiation sources operates at a different frequency.

13. The system of claim 10, wherein each of said plurality of sources on one side of said casing operates at the same frequency while the sources on the other sides operate at different frequencies whereby desired difference frequencies are produced in said treatment zone.

14. The system of claim 1 or 10, wherein the material to be treated is preheated before it enters said treatment zone, said preheating being achieved by utilizing at least one of the heat generated by said microwave sources and heat recovered from the treated material as it exits from the treatment system.

15. A method of treating materials using microwave radiation, comprising the steps of directing non-coherent microwave radiation from at least three different directions from radiation means into a treatment zone containing material to be treated, said radiation being directed along axes which are in spaced relation to each other at the radiation means, said treatment zone confining said material to be treated in at least a partly cylindrical form whereby said microwave radiation is caused to be focused on the material in said treatment zone, and reflecting any microwave radiation which passes through said treatment zone back towards said treatment zone.

16. The method of claim 15, wherein the material to be treated is transported through said treatment zone in at least partly cylindrical form.

17. The method of claim 15 or 16, wherein the microwave radiation directed into said zone is operated at least two different frequencies so as to produce a desired difference frequency.

* * * * *